United States Patent

[11] 3,575,046

| [72] | Inventors | Henry S. Shattles;<br>James F. George, Phoenix, Ariz. |
|---|---|---|
| [21] | Appl. No. | 829,504 |
| [22] | Filed | June 2, 1969 |
| [45] | Patented | Apr. 13, 1971 |
| [73] | Assignee | Arcoa International, Inc.<br>Phoenix, Ariz. |

[54] METHOD FOR TESTING A VEHICLE TRAILER HITCH
9 Claims, 13 Drawing Figs.

[52] U.S. Cl. .................................................. 73/95, 73/101
[51] Int. Cl. .................................................. G01n 3/08, G01n 3/24, G01n 3/28
[50] Field of Search .................................................. 73/91, 92, 93, 95, 97, 101, 103, 141, 12, 88; 280/400 (Inquired), 411

[56] References Cited
UNITED STATES PATENTS

| 2,007,286 | 7/1935 | Schopper | 73/51 |
| 2,321,875 | 6/1943 | Temple | 73/97 |
| 3,326,576 | 6/1967 | Kothman | 280/515 |
| 3,459,037 | 8/1969 | Holzman | 73/71.7 |

Primary Examiner—James J. Gill
Assistant Examiner—John Whalen
Attorney—David H. Semmes ABSTRACT: Method for testing the strength of a vehicle trailer hitch, including supporting the vehicle rear against vertical and longitudinal movement, while pulling vertically and longitudinally with respect to the hitch. The pulling-longitudinally is radially varied, so as to measure the effects of trailer loads from variant sectors.

Patented April 13, 1971

INVENTORS
HENRY S. SHATTLES
JAMES F. GEORGE

BY David H. Semmes

ATTORNEY

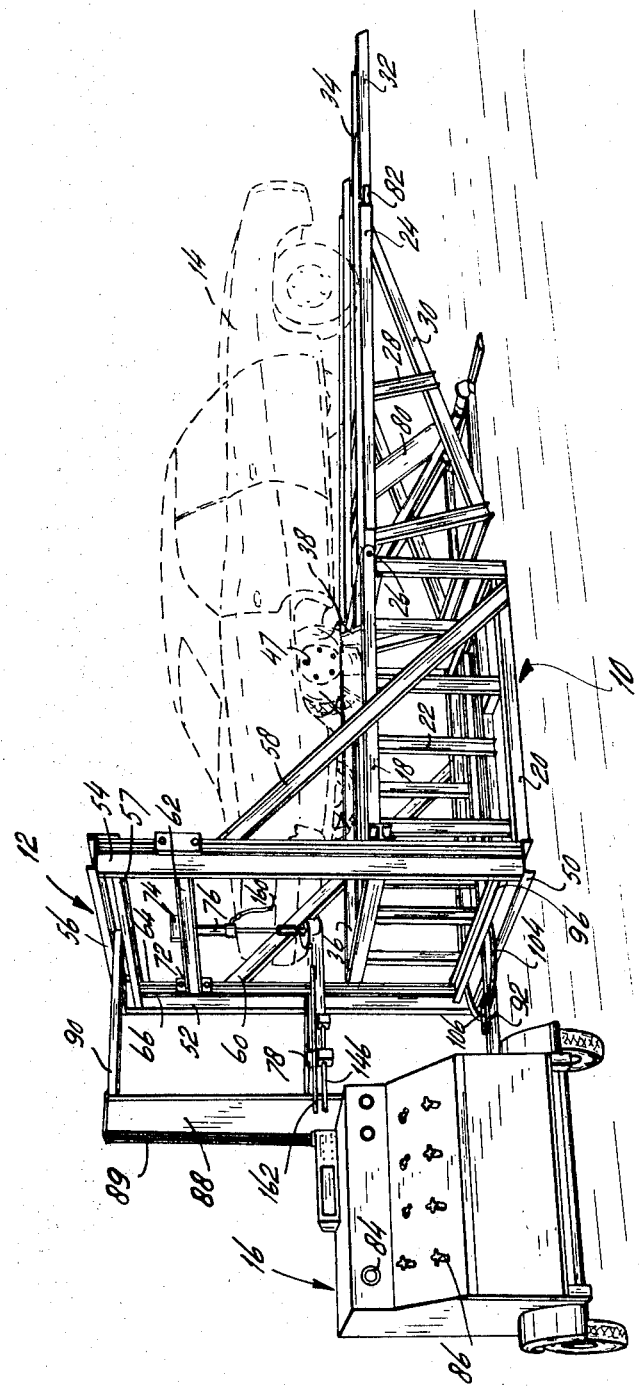

INVENTORS
HENRY S. SHATTLES
JAMES F. GEORGE
BY David H. Semmes
ATTORNEY

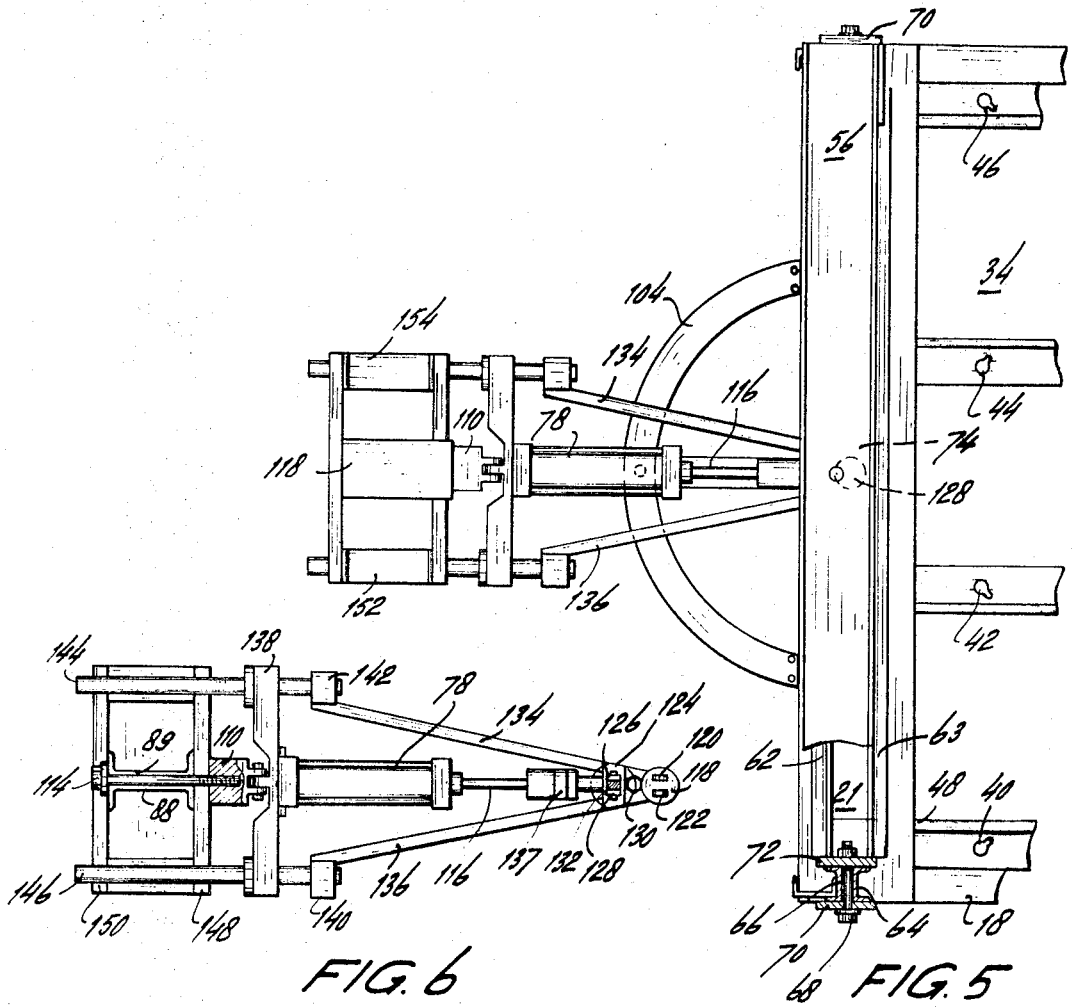
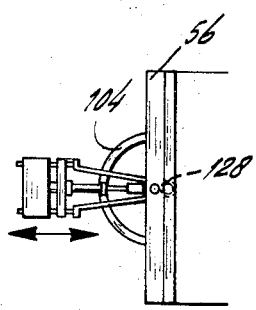
FIG. 7
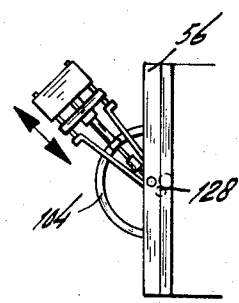
FIG. 8
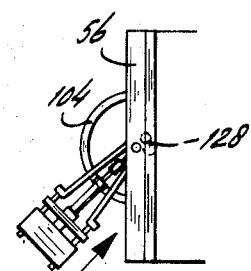
FIG. 9
INVENTORS
HENRY S. SHATTLES
JAMES F. GEORGE
ATTORNEY

METHOD FOR TESTING A VEHICLE TRAILER HITCH

BACKGROUND OF THE INVENTION

1. Field of the Invention

There are numerous trailer-oriented industries, for example, mobile home trailers, boat trailers, rental trailers for moving of household goods, horse trailers and camper trailers. A great deal of attention has been given to the design of safety lighting, signaling and braking devices for these trailers, but very little attention has been given to means for testing the hitches used to connect the trailers to the towing vehicle. Conventionally, the towing vehicle is provided with a ball-socket device which is engaged by a corresponding concave socket on the towing vehicle tongue. Previously, there has been no load testing or standards, despite the criticality of the hitch fixture, particularly when the trailer is being towed at expressway speeds. To this date, neither the U.S. Government nor the States have established safety standards for the loads borne by towing vehicle trailer hitches. The present invention concerns a method for testing the strength of such hitches.

2. Description of the Prior Art

For the most part, the prior art has restricted itself to strain gauges, longitudinally aligned with a tractor or railroad car hitch, so as to indicate the amount of pull in a longitudinal plane.

Prior art searching has developed the following:
  Miner U.S. Pat. No. 1,137,999
  Hefner U.S. Pat. No. 2,640,353
  Eisenbart U.S. Pat. No. 2,641,926
  Dreier U.S. Pat. No. 3,110,176

The Dreier, Hefner and Eisenbart patents concern strain gauges applied to tractor hitches. The Miner device is used for testing the action of "draft rigging" in railroad cars.

None of these patents remotely suggest the concept of radially displacing the longitudinal test fixture or of simultaneously applying vertical and longitudinal testing forces to the hitch.

SUMMARY OF THE INVENTION

According to the present invention, a vehicle rear is secured against longitudinal and vertical movement, then a load is pulled vertically upwardly or downwardly with respect to the hitch and a load is pulled longitudinally away from or toward the hitch. The strength of the hitch may be measured both by the vertical and longitudinal deflection of the vehicle hitch in relation to the loads imposed. The longitudinal pulling of the load includes radial repositioning, so as to test the hitch when pulled from a variety of radial segments within 180° of the automobile rear bumper.

A suggested test fixture includes an automobile ramp having means for securing the auto rear against movement, a hitch test frame secured at the rear of said ramp and supporting adjustably vertical and longitudinal stress elements. The stress elements may consist of an hydraulic cylinder and load cell combination. A swivel arm is pivoted to the hitch test frame, so as to radially reposition the longitudinal stress element.

BRIEF DESCRIPTION OF THE DRAWINGS

FIG. 2 is a perspective view of a proposed test fixture, showing a vehicle in phantom;

FIG. 5 is a fragmentary top plan of the auto ramp rear, the hitch test frame and a radially pivoted swivel arm;

FIG. 6 is a top plan, partially in section, of the swivel arm and its test fixture bearing tongue;

FIG. 7 is a schematic view showing the longitudinal load being pulled axially away from the hitch;

FIG. 8 is a like schematic view showing the longitudinal load being pulled radially away from the hitch at a 45° angle; and FIG. 9 is a schematic view showing the longitudinal load being pulled away from the hitch at 45° angle on the other side.

DESCRIPTION OF THE PREFERRED EMBODIMENTS

Figure 1A:
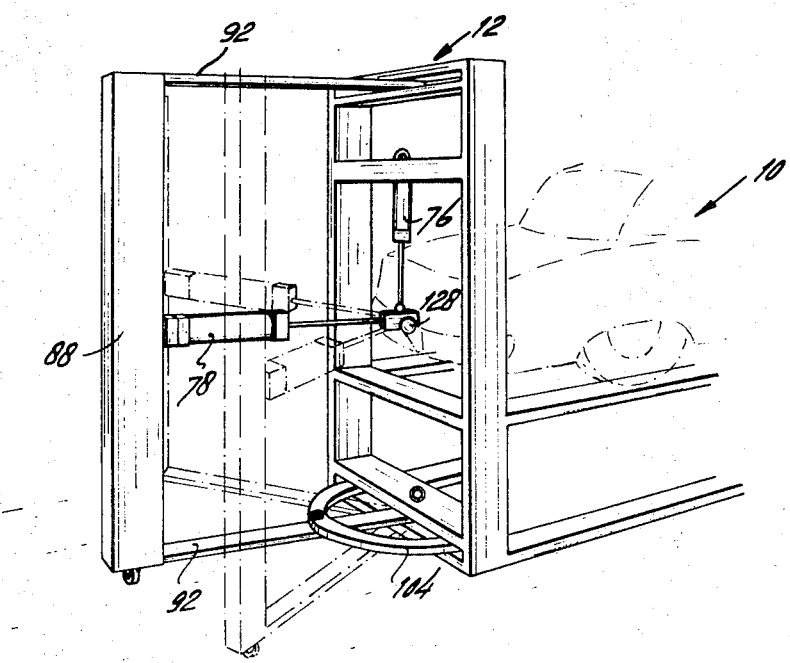
FIG. 1A is a perspective view of a proposed testing fixture, wherein the longitudinal stress element is radially repositionable.
Figure 1B:
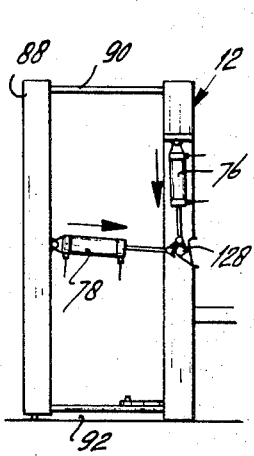
FIGS. 1B—E illustrate schematically a variety of vertical and longitudinal stressing attitudes, according to the present method.
Figure 1C:
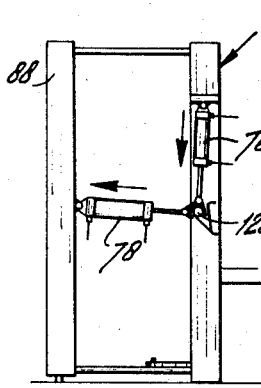
Figure 1D:
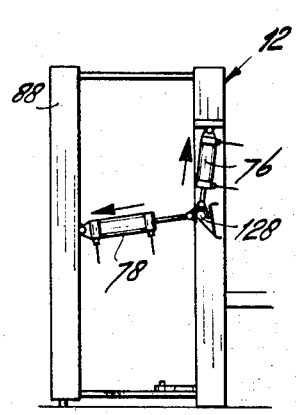
Figure 1E:
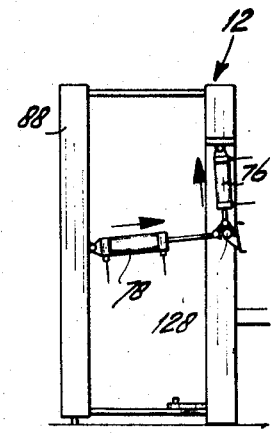

In FIG. 2 a suggested test fixture is illustrated as comprising vehicle ramp 10 supporting a vehicle 14 (shown in phantom) adjacent a hitch test frame 12, so that hydraulic stressing assembly 16 may be used to stress the vehicle hitch by means of vertical hydraulic cylinder 76 and longitudinal hydraulic cylinder 78 with associated load cells and adjusting assemblies.

The ramp 10 is illustrated as having a top comprised of a plurality of top channels 18 and a bottom comprised of base channels 20 interconnected by vertically upstanding channels 22, so that plates 34 are supported for travel of the vehicle on the ramp. As illustrated in FIG. 5, a plurality of identical channels 48 are provided with chain-locking apertures 40, 42, 44 and 46, the locking chains extending from these apertures to the vehicle hub 47. The ramp front portion is comprised of horizontal base members 30, vertical members 28 supporting inclined channels 24 and 32. The front end 32 is hinged as at 82 and the rear end is pivoted by pin 26 to frame 10. A hydraulic piston assembly 80 may be used to pivot the front end upwardly, as shown in FIG. 2, so as to level the vehicle during testing. As the vehicle is leveled, the rear wheels are removed and the hubs are locked by means of chains 38 engaging the chain engaging apertures 40—46. The locking is enhanced by the jacking up of the rear axle, so as to support the vehicle ball 128 intermediate hitch test frame 12.

The hitch test frame 12 is comprised of vertical channels 52 and 54, interconnected at their top by channel 56 and interconnected at their bottom by channels 96 and 50. Channels 52 and 54 support identical inner channels 64 and 66 which define a vertical stressing member adjusting slot 65. The vertical adjusting member is supported on identical channels 62, 63 affixed at their ends by plates 72 so as to define a transverse aperture for repositioning of vertical testing block 74 and its associated hydraulic vertical testing assembly 76. Plates 70 and 72 are vertically adjustable in slots 65 by means of bolts 68 extending through the channels 64 and 66. Manifestly, the vertical stressing assembly 76 can be adjusted by vertical repositioning of channels 62 and 63 as well as transverse repositioning of block 74, in slot 71, defined by channels 62 and 63. The hitch test frame may be strengthened by means of inclined support beams 58 extending from the ramp base elements 20.

Figure 4:
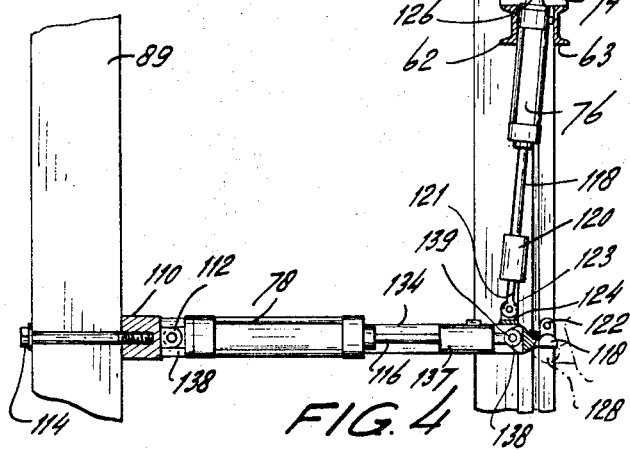
FIG. 4 is a fragmentary transverse section of the vertical and longitudinal stressing elements positioned in the hitch test frame.

As further illustrated in FIG. 4, the vertical stressing cylinder 76 is pivoted to block 74 as at 126 and includes downwardly extending piston arm 118, load cell 120 and associated eyebolt 121, secured to pin 123 extending through lugs 126, 128, mounted upon plate 124. Plate 124 may extend over the tongue-arms 134 and 136, so as to be axially aligned with vehicle ball 128, shown in phantom in FIGS. 5 and 6.

The longitudinal stressing element cylinder 78 is vertically adjustably secured with respect to swivel arm elements 88 and 89 by means of bolt 114 extending between elements 88 and 89 into threaded block 110, having a clevis element 112 engaging the base of piston 78. Piston 78 includes piston rod 116 secured to load cell 136, having associated eyebolt 138, pivoted upon a transverse pin secured intermediate converging arms 134 and 136.

The tongue assembly is particularly illustrated in FIG. 6, showing the diverging arm ends 134, 136 having guides 140 and 142, supporting respectively reciprocable pins 144 and 146. A cradle assembly 138 is provided for securement to the cylinder 78 base and serves to align arms 146 and 144, which extend through plates 148 and 150, supported on either side of the channels 88 and 89, by cap plate 118.

Figure 3:
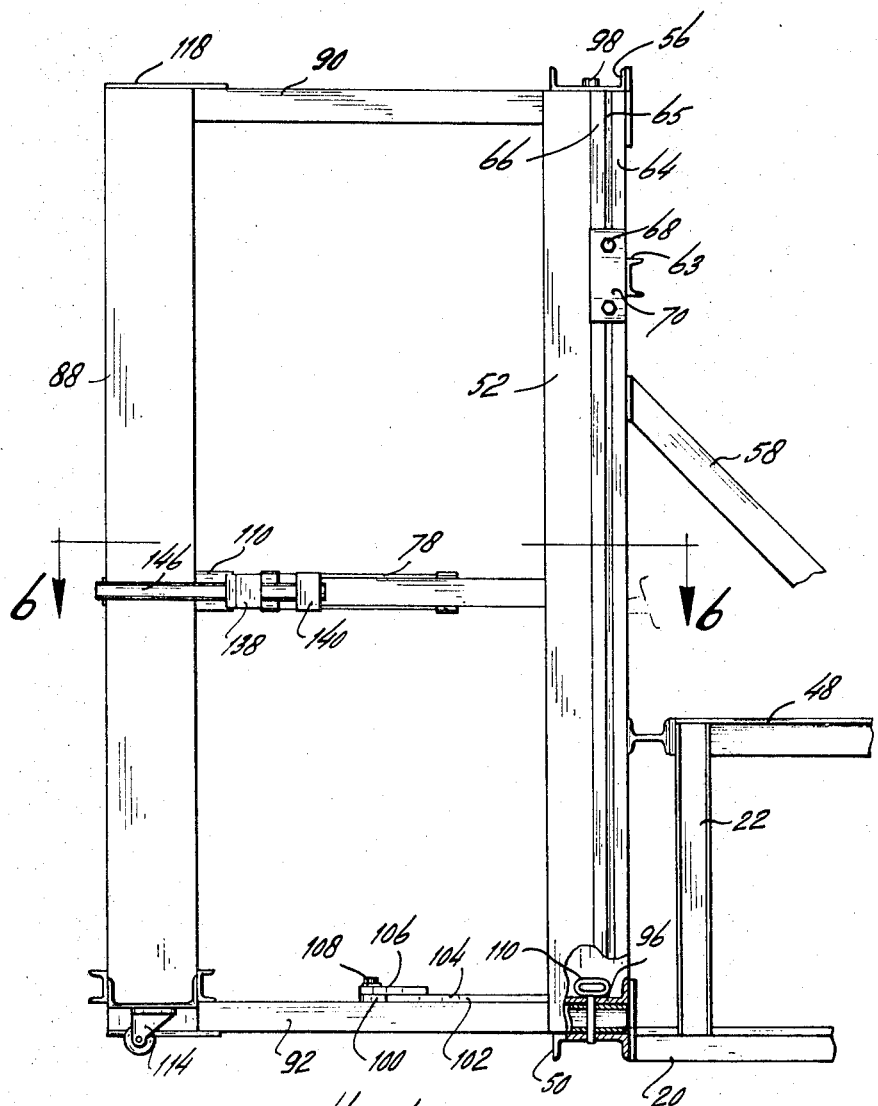
FIG. 3 is a fragmentary vertical section of the hitch test frame, showing the vehicle rear bumper in phantom.

As will be apparent, the tongue may be raised or lowered intermediate channels 88 and 89 so as to be longitudinally aligned with the hitch axis of any type of vehicle. The channels 88 and 89 support at their top and bottom arms square tubing 90 and 92, pivoted respectively at 98 and 110 in the hitch test frame top and bottom members 56 and 50. Arcuate guidance of the swivel arm is provided by arcuate member 104 extending, as shown in FIG. 3, through plates 100 and 102, defining with plates 106 and bolt 108 an arcuate aperture. Caster elements 114 may be positioned beneath the channels 88 and 89 so as to pivot the longitudinal testing assembly radially with respect to the automobile hitch.

In FIGS. 7, 8 and 9, there is illustrated the radial pivoting of the swivel arm with respect to the ball socket 128. As will be apparent, the swivel arm may be positioned in any radial segment and is not restricted to positioning at 45° angles. Vertical measuring element 160 may be supported adjacent hydraulic testing assembly 76 and a longitudinal measuring element 162 may be supported adjacent the converging arms 134 and 136 to measure the degree of displacement of the hitch upon application of the stressing forces.

Manifestly, various structures may be employed for testing without departing from the claims.

I claim:

1. A hitch test fixture of the type used for testing a vehicle trailer hitch comprising:
   A. a vehicle-supporting ramp;
   B. a vertical hitch test frame mounted at the rear of said ramp, adjacent the hitch of a vehicle supported upon the ramp;
   C. a vertical swivel arm pivoted at its top and bottom in said hitch test frame;
   D. a hitch tongue assembly adjustably secured in said vertical swivel arm; and
   E. a vertical hitch stress piston extending from the top of said tongue adjacent said hitch to said hitch test frame for applying vertical loads to said hitch; and
   F. a longitudinal hitch stress piston supported upon said tongue and extending from said vertical swivel arm to said hitch for applying longitudinal loads to said hitch.

2. A hitch test fixture of the type used for testing a vehicle trailer hitch as in claim 1, including an arcuate guide supported at the end of said ramp beneath said hitch test frame and engaging said swivel arm, so as to guide said swivel arm in a radial testing arc.

3. A hitch test fixture of the type used for testing a vehicle trailer hitch as in claim 2, including:
   G. a vertically adjustable horizontal element supported at either end in said hitch test frame and vertically adjustably securing said vertical hitch stress piston.

4. A hitch test fixture of the type used for testing a vehicle trailer hitch as in claim 3, including:
   H. a plurality of lock chains extending from said ramp to the vehicle hub and securing said vehicle to said ramp.

5. A hitch test fixture of the type used for testing a vehicle trailer hitch as in claim 4, said ramp including:
   I. an inclined foreportion pivoted to the end of said ramp opposite said hitch test frame, and
   J. means for pivoting said foreportion to level with said rear portion during testing.

6. A hitch test fixture as in claim 5, wherein said vertical hitch stress piston and longitudinal hitch stress piston are hydraulically activated.

7. A hitch test fixture of the type used for testing a vehicle trailer hitch as in claim 5, said means for pivoting, including hydraulic piston means supported beneath said ramp, so as to level said ramp after an automobile is positioned thereon for testing.

8. A hitch test fixture as in claim 7, including a measuring means supported within said hitch test frame, so as to measure the amount of deflection of said hitch upon application of vertical and longitudinal stressing forces.

9. A method of strength testing a trailer hitch mounted on the rear bumper of a vehicle comprising the steps of: locking the rear end of the vehicle in a manner which will prevent horizontal and vertical movement thereof and applying a load sequentially from a plurality of horizontal directions within the 180° defined by said rear bumper to simulate the pulling stresses applied to said hitch during actual use, while simultaneously applying a vertical load to said hitch to simulate the vertical stresses applied to said hitch during actual use.